Nov. 14, 1967 L. E. KILMARX 3,352,531
CHECK VALVE
Filed April 2, 1964

INVENTOR
LOUIS E. KILMARX
BY
Byerly, Townsend, Watson & Churchill
ATTORNEYS.

United States Patent Office 3,352,531
Patented Nov. 14, 1967

3,352,531
CHECK VALVE
Louis E. Kilmarx, Massapequa Park, N.Y., assignor to Scovill Manufacturing Company, Waterbury, Conn., a corporation of Connecticut
Filed Apr. 2, 1964, Ser. No. 356,835
5 Claims. (Cl. 251—149.6)

The present invention relates to check valves and more particularly to a miniature check valve assembly for use with a catheter and the like.

A catheter is a medical instrument for introduction into a canal or passage of the body for filling a cavity therein or for withdrawing fluid from a cavity in the body.

Catheters are of two general types, one which consists of a tubular member for introduction into the bladder through the urethra to draw off urine and the other, a double-walled flexible tubular device which terminates at its outer end in two separate tubular branches, one of which continues as the outer tube of the device terminates at its inner end in an inflatable portion adapted to be inflated while disposed within an internal body cavity and the other branch which continues as the inner tube of the device has a through passage which extends through the inflatable portion of the outer tube. With both types of catheters, it is at times desirable to control the flow of fluid therethrough wherefore valve means are associated with or incorporated in the catheter for this purpose.

An object of the present invention is to provide a miniature check valve assembly which when used with a catheter and the like to control the flow of fluid therethrough is of a form to prevent unauthorized operation thereof by a patient.

A further object of the invention is to provide an exceedingly simple, expendable check valve, the parts of which can be mass produced, readily assembled and sold at a very nominal price.

The foregoing and other objects of the invention, not specifically enumerated, I accomplish by providing a miniature check valve assembly which comprises a tubular housing having in the bore thereof an inwardly facing shoulder or valve seat, an annular sealing or valve member in said bore and movable therein, spring means biasing the valve member into seating engagement with the valve seat, a pin within the housing bore and having an outer end part over which the annular valve member engages to normally seal off the fluid passage through the annular valve member, unseating of the valve member from its seat also operating to break the seal between the valve member and the pin and establish open communication for fluid through the housing. The relationship of parts constituting the check valve assembly are such that the valve member can be unseated only by a tubular depresser when inserted into the outer end of the bore in the housing. The invention will be more fully understood from the detailed description which follows when considered in connection with the accompanying drawing wherein:

Figure 1:
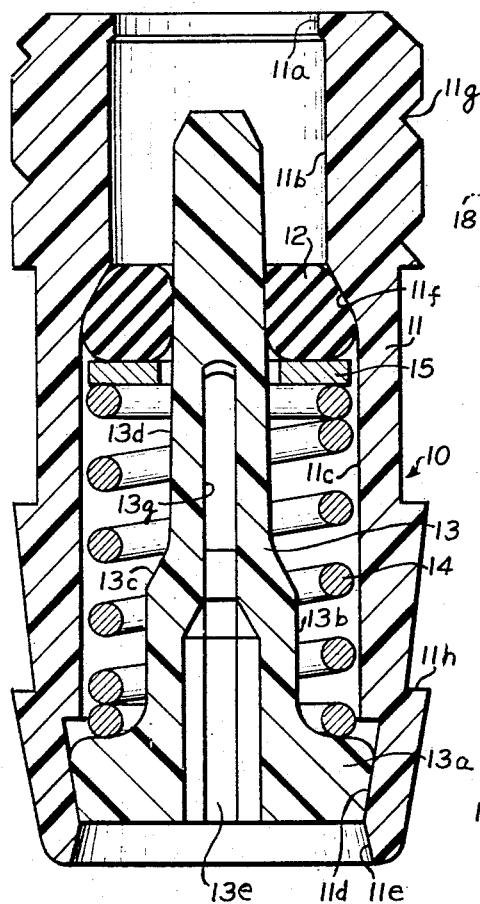
FIG. 1 is an enlarged diametrical section through a check valve assembly embodying the invention.

Referring to the drawing wherein there is shown a preferred embodiment of the invention, the check valve assembly which is designated by the reference numeral 10, consists of a tubular housing 11 having mounted therein an annular sealing member 12, engaging over the outer end portion of a pin 13, the sealing member being held in its operative sealing position by a helical spring 14 acting against a washer 15 bearing against the sealing member.

The tubular housing 11 has a bore therethrough with portions 11a, 11b, 11c, 11d and 11e, of different diameters, the bore portions 11b and 11c providing therebetween a substantially conical shoulder or valve seat 11f. The exterior of the housing at its outer end is provided with a quick thread 11g and at its inner end with a serrated surface 11h. The functions for the quick thread 11g and the serrated surface 11h will presently become apparent. The bore portion 11d as it extends inwardly from the inner end of the housing is of progressively larger diameter for a purpose which will also presently appear. The housing may be formed of any suitable synthetic resin capable of being molded, such as nylon or the like.

The annular sealing member 12 as herein shown is an elastic O-ring having an outer diameter slightly larger than the diameter of the bore portion 11c of the housing and an inner diameter slightly smaller than the diameter of the pin 13 at its outer end portion, so that it will provide a fluidtight seal with both the inner bore of the housing and the exterior of the pin 13 in the normal position of the valve wherein the O-ring is held in engagement with the shoulder 11f by the spring 14.

The pin 13 is hollow and closed at its outer end and preferably of a length shorter than the axial dimension of the housing within the bore of which it is co-axially mounted and fixedly held by having an enlarged foot portion 13a at the inner end of the pin forcefitted into the bore portion 11d of the housing. In this connection it will be noted that the foot portion 13a at its outer periphery has a tapered portion which is complementary to the bore portion 11d and hence when forced through the bore portion 11e at the inner end of the housing it will be fixedly held within the bore portion 11d by the spring 14. The pin 13 above its foot portion 13a has a cylindrical portion 13b which merges through a tapered shoulder 13c with a portion 13d which has a slight taper from the outer end of the portion 13c to the outer end of the pin. The foot portion 13a of the pin is formed with an axial passage 13e which is intersected by transverse slots 13f and 13g through the cylindrical portion 13b and the tapered portion 13d, respectively. The transverse slot 13g terminates axially inward of the sealing member 12 in the closed position of the valve as best shown in FIG. 1. Like the tubular housing 11, the pin 13 is preferably also formed of a moldable plastic such as nylon or the like.

Figure 3:
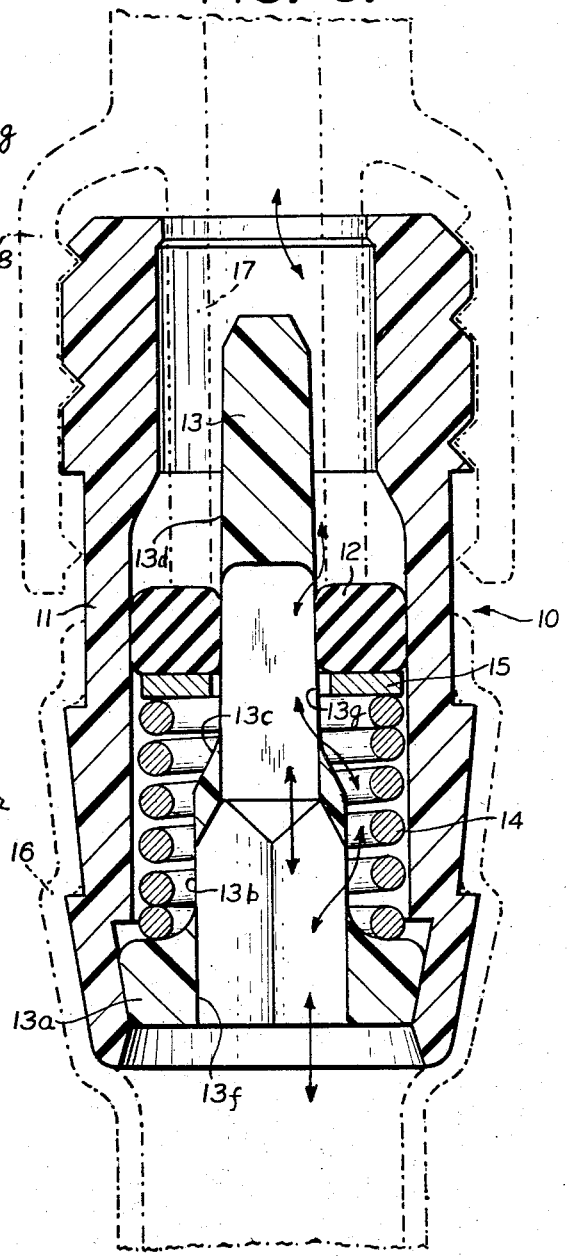
FIG. 3 is a view similar to FIG. 1 taken at a right angle thereto and showing the valve in open position.
Figure 2:
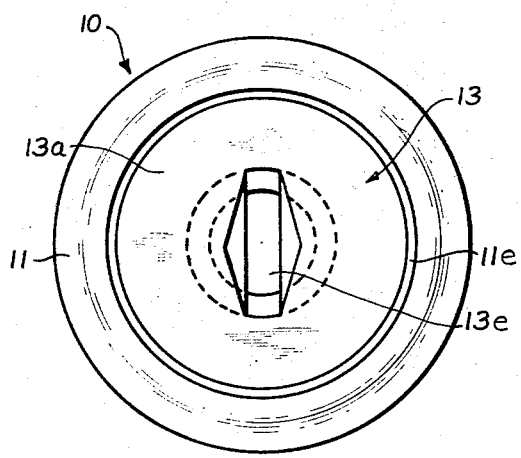
FIG. 2 is a bottom plan view of the valve shown in FIG. 1.

From an inspection of FIG. 1, it will be apparent that normally the sealing member 12 provides a fluidtight fit with the shoulder 11f and with the outer unslotted end portion of the pin 13. It will also be evident that the sealing member 12 may be pushed or forced inwardly from its normal seating position shown in FIG. 1 to a position such as shown in FIG. 3, wherein the sealing member extends below the transverse slot 13g and thus establishes open communication for fluid through the housing in either direction, e.g., from inwardly of, to outwardly of the sealing member.

The check valve assembly is primarily intended for use with catheters and the like, hence it is of extremely small size. Preferably, it has an overall length of approximately 0.60 of an inch, an outer diameter of approximately 0.30 of an inch and a diameter at its bore portion 11a of approximately 0.16 of an inch. The diameter of the pin portion 13d is approximately 0.07 of an inch and hence the radial dimension of the annular space between the pin portion 13d and the bore portion 11b is approximately 0.05 of an inch. Moreover, the sealing member 12 in the closed position of the valve is spaced a substantial distance inwardly from the outer end of the housing, wherefore the dimensions are so small as to prevent unauthorized unseating of the valve by a patient since to unseat such valve requires a tubular instrument having an outer diameter to engage within the bore portion 11a and an inner diameter to engage over the outer end portion 13d of the pin.

As illustrated in phantom in FIG. 3 of the drawing, the inner end of the check valve assembly may be inserted into the end of a rubber tube 16 which may be connected to a catheter for introduction into a cavity in the body and in normal position of the valve, fluid from such cavity will enter the housing 11 below the sealing member 12. The valve may be actuated by a tubular depresser such as a hollow needle 17 of a hypodermic syringe having a threaded coupling sleeve 18 adapted to engage the screw thread 11g while the hollow needle enters the bore of the housing and upon screwing the coupling sleeve over the thread 11g the inner end of the hollow needle engages the O-ring sealing member 12 and pushes it inwardly below the outer end of the slotted portion 13g of the pin so that fluid flow can take place through the valve housing as indicated by the arrows in FIG. 3. Withdrawal of the hollow needle 17 checks the flow since the O-ring is again seated by the force of the spring 14.

While I have shown and described a preferred embodiment of my invention, it is to be understood that changes in details of construction from that shown may be resorted to without departing from the spirit of the invention as claimed.

What I claim is:

1. A check valve assembly comprising a tubular housing having in the bore thereof inwardly from its outer end an inwardly facing shoulder, an annular deformable elastic sealing member in said bore and providing therewith a fluidtight fit, spring means biasing the annular sealing member into engagement with the shoulder, a hollow pin closed at its outer end within the housing bore, the annular sealing member normally engaging over the outer closed end portion of said pin with a fluidtight fit, said closed outer end portion of the pin and said annular sealing member being axially movable, one relatively to the other, and the hollow portion of the pin inwardly of the annular sealing member when in engagement with said shoulder having a transverse passage providing open communication between the hollow portion of the pin and the housing bore, whereby relative axial movement between the annular sealing member and the pin, through a predetermined distance greater than the axial dimension of the sealing member will establish open communication for fluid through the bore of the housing.

2. A check valve assembly according to claim 1, wherein the annular sealing member is slidable in the bore of the housing and over the pin and the pin is fixedly held within the bore of the housing.

3. A check valve assembly according to claim 1, wherein the annular sealing member is an elastic O-ring.

4. A check valve assembly according to claim 1, wherein the portion of the pin inwardly of the annular sealing member which has open communication with the housing bore has a transverse slot therein.

5. A check valve assembly comprising a tubular housing having in the bore thereof, inwardly a substantial distance from the outer end an inwardly facing shoulder, an annular deformable elastic sealing member slidable in said bore and providing therewith a fluidtight fit, spring means biasing the annular sealing member into engagement with the shoulder, a hollow pin fixedly held within the housing bore, the outer end of said pin inwardly of said outer end having a transverse passage providing open communication between the interior of the pin and the housing bore, the annular sealing member normally engaging over the outer closed end portion of said pin with a fluidtight fit, said passage in the pin providing fluid communication through the housing when the sealing member is moved inwardly a predetermined distance to uncover the passage in the pin, the area of the sealing member exposed to the outer end of the housing being ring-shape and having a radial dimension to be engageable for unseating only by a thin-walled tubular member having an inner diameter to engage over the outer end of the pin and an outer diameter slightly smaller than the bore diameter of the housing.

References Cited

UNITED STATES PATENTS

| 2,485,006 | 10/1949 | Main | 137—614.03 |
| 2,505,093 | 4/1950 | Brock | 137—614.03 |
| 3,265,101 | 8/1966 | Shiozaki | 137—588 |

FOREIGN PATENTS

| 555,733 | 3/1957 | Belgium. |
| 355,167 | 8/1961 | Switzerland. |

M. CARY NELSON, *Primary Examiner.*

A. CLINE, *Assistant Examiner.*